United States Patent [19]

Watts et al.

[11] 4,230,774

[45] Oct. 28, 1980

[54] HEAT SEALABLE LAMINATE

[75] Inventors: William A. Watts, Uniontown; Mark D. Creekmore, Akron, both of Ohio

[73] Assignee: The Goodyear Tire & Rubber Company, Akron, Ohio

[21] Appl. No.: 879,824

[22] Filed: Feb. 21, 1978

[51] Int. Cl.² ............................................. B32B 27/30
[52] U.S. Cl. ................................... 428/518; 428/519; 428/520
[58] Field of Search ........................ 428/518, 519, 520

[56] References Cited

U.S. PATENT DOCUMENTS

| | | | |
|---|---|---|---|
| 4,029,850 | 6/1977 | Ishii et al. | 428/518 |
| 4,038,449 | 7/1977 | Uemura et al. | 428/519 X |
| 4,123,576 | 10/1978 | Kobayashi et al. | 428/518 X |

FOREIGN PATENT DOCUMENTS 1375433  11/1974  United Kingdom ..................... 428/519

*Primary Examiner*—George F. Lesmes
*Assistant Examiner*—E. Rollins Buffalow
*Attorney, Agent, or Firm*—J. D. Wolfe

[57] ABSTRACT

A laminate of a blend of 40 to 80 parts of polyvinyl chloride and 60 to 20 parts of a copolymer of butadiene acrylonitrile adhered to a substrate of polypropylene with a latex or solvent solution of a copolymer of vinylidene chloride and a second monomer of vinyl chloride or acrylonitrile can be formed as films which have excellent heat sealability.

1 Claim, No Drawings

HEAT SEALABLE LAMINATE

This invention relates to a laminate that has the ability to be readily heat sealed and also in the form of films can be shaped to function as a container for comestibles and related materials.

Film bags for food, meats and related comestibles are widely used. These films in general should exhibit good low to high temperature seal properties, excellent antiblocking attributes, low taste, odor and extractable contamination properties, and in many instances, serve as a barrier to the passage of oxygen and water vapor.

The object of this invention is to provide a new laminate which can be formed into a film and then be readily heat sealed to form closed bags or containers.

The laminate of this invention comprises a layer of polypropylene adhered with polyvinylidene chloride to a layer of a blend of 40–80 parts of polyvinyl chloride and 60–20 parts of a copolymer of 60–70% by weight of butadiene and 40–30% by weight of acrylonitrile. Laminates of this composition are satisfactory for packaging Swiss cheese and related food products.

The nature of this invention can be seen and understood more readily by reference to the following examples wherein all parts and percentages are by weight unless otherwise indicated.

EXAMPLE I

A solvent blend of vinyl chloride and 33% acrylonitrile/67% butadiene copolymer was made by mixing the ingredients according to the following recipe:
- 100 parts of vinyl chloride resin,
- 100 parts of acrylonitrile/butadiene copolymer,
- 2.0 parts trisnonyl phenyl phosphite,
- 0.6 parts of a waxy fatty acid amide, and
- 1149 parts of tetrahydrofuran.

This solution was used to solvent coat a film of 0.5 to 5 mils thickness on a commercial casting surface suitable for casting vinyl resin. The preferred ranges are 2 to 3 mils.

This vinyl resin film was laminated to a commercial polypropylene film of 2 to 5 mils thick by placing a layer of a copolymer of vinylidene chloride and vinyl chloride or acrylonitrile (available under the tradename Saran) therebetween and pressing to form a laminate.

In the preferred embodiment, the polypropylene film is coated with a latex of vinylidene chloride and vinyl chloride copolymer to give an adhesive coat or film on the polypropylene prior to application of the film of a blend of polyvinyl chloride and copolymer of butadiene acrylonitrile thereto as films pass between laminating rolls.

The rolls of the laminates preferably are warm enough to volatilize water in latex and achieve bonding as the films pass between the rolls and are pressed together.

These three component laminates had excellent heat seal properties and were used to package Swiss cheese in a hot sealed package.

While certain representative embodiments and details have been shown for the purpose of illustrating the invention, it will be apparent to those skilled in this art that various changes and modifications may be made therein without departing from the spirit or scope of the invention.

What is claimed is:

1. A laminate comprising a film of a blend of 40 to 80 parts of polyvinyl chloride and 60 to 20 parts of a copolymer of about 60–70% by weight of butadiene and about 40–30% by weight of acrylonitrile adhered to a film of polypropylene with an adhesive layer of a copolymer of vinylidene chloride and a second monomer of vinyl chloride or acrylonitrile.

* * * * *